Figure 1:
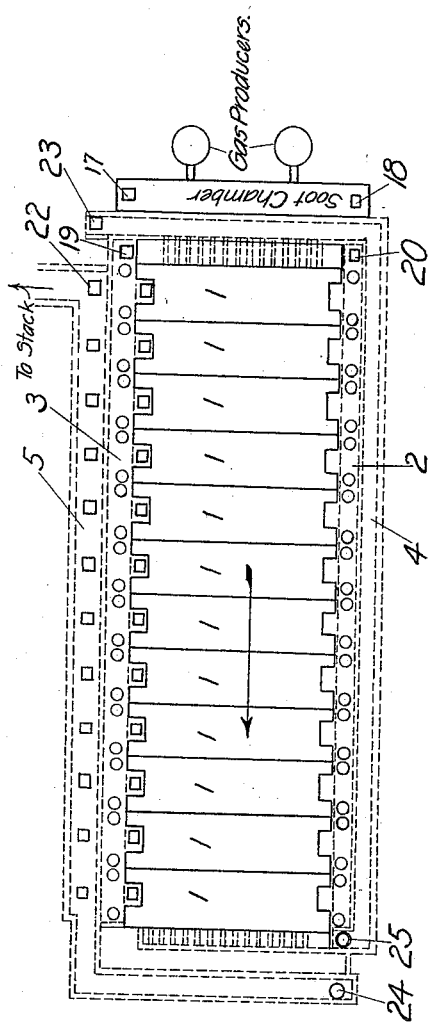

W. D. RICHARDSON.
CONTINUOUS COMPARTMENT GAS FIRED KILN.
APPLICATION FILED JUNE 9, 1913.

1,133,885.

Patented Mar. 30, 1915.
6 SHEETS—SHEET 1.

Willard D. Richardson, Inventor

Witnesses
Frederick W. Ives.
C. E. O'Neill

By Edwin P. Corbett, Attorney

W. D. RICHARDSON.
CONTINUOUS COMPARTMENT GAS FIRED KILN.
APPLICATION FILED JUNE 9, 1913.

1,133,885.

Patented Mar. 30, 1915.
6 SHEETS—SHEET 6.

Witnesses
Frederick W. Ives.
C. E. O'Neill

Inventor
Willard D. Richardson.
By Edwin P. Corbett
Attorney

UNITED STATES PATENT OFFICE.

WILLARD D. RICHARDSON, OF WORTHINGTON, OHIO.

CONTINUOUS COMPARTMENT GAS-FIRED KILN.

1,133,885.  Specification of Letters Patent.  Patented Mar. 30, 1915.

Application filed June 9, 1913. Serial No. 772,583.

*To all whom it may concern:*

Be it known that I, WILLARD D. RICHARDSON, a citizen of the United States of America, residng at Worthington, in the county of Franklin and State of Ohio, have invented certain new and useful Improvements in Continuous Compartment Gas-Fired Kilns, of which the following is a specification.

My invention relates to kilns for burning ware of various kinds and is particularly directed to the improvement of continuous compartment gas-fired kilns, although it will appear hereinafter that there are certain features of my invention which may have a wider application. It will be seen that there are several features of primary importance, all of which tend to produce a superior kiln.

One feature of my invention is the result of a recognition by me, and the utilization of the fact for the first time in the art, that the gas introduced into the kiln is lighter than the air with which it is mixed. Briefly, I have improved the art by introducing the air at points above the gas so that the natural tendency of the gas to rise more rapidly is taken advantage of to attain a more thorough mixing of the gas and air. In preferred form, I introduce the gas to the mixing points behind the bags and, at the same time, I introduce the air at a point or at points immediately above and preferably direct the said air downward onto the gas. Both the gas and air rise but the gas rises more rapidly and a more intimate mixing results. The structure by which this may be attained is subject to variation. Considerable difficulty has hitherto been experienced because of improper mixing of the air and gas before combustion takes place. I have utilized the natural tendencies of the gas and air to obviate this difficulty.

Another important feature of my invention consists in the obviation of certain defects which have hitherto been inherent in kilns of this type, due to the custom of placing the gas and air flues in the compartment walls of the kiln. This custom has hitherto resulted, because of expansion and contraction under temperature changes and inevitable cracking of the walls, in frequent leakage of the gas or air, or both. My invention eliminates all such danger by providing a structure wherein the gas ducts are below the walls of the compartments and do not extend therethrough. Thus, leakage is avoided and, at the same time, rebuilding is greatly facilitated from the very lack of necessity for disturbing the flues in tearing down the compartment walls. Practice has demonstrated that the longevity of a compartment is increased by firing it upon both sides, for the reason that the walls always have a tendency to draw toward the flames. It is admitted among the foremost students in the field that, for this reason, a "one-side firing" frequently results in a distorted kiln arch and ultimate collapse.

An important feature of my invention consists in the particular structure whereby gas is conducted to both sides of a compartment.

Figure 2:
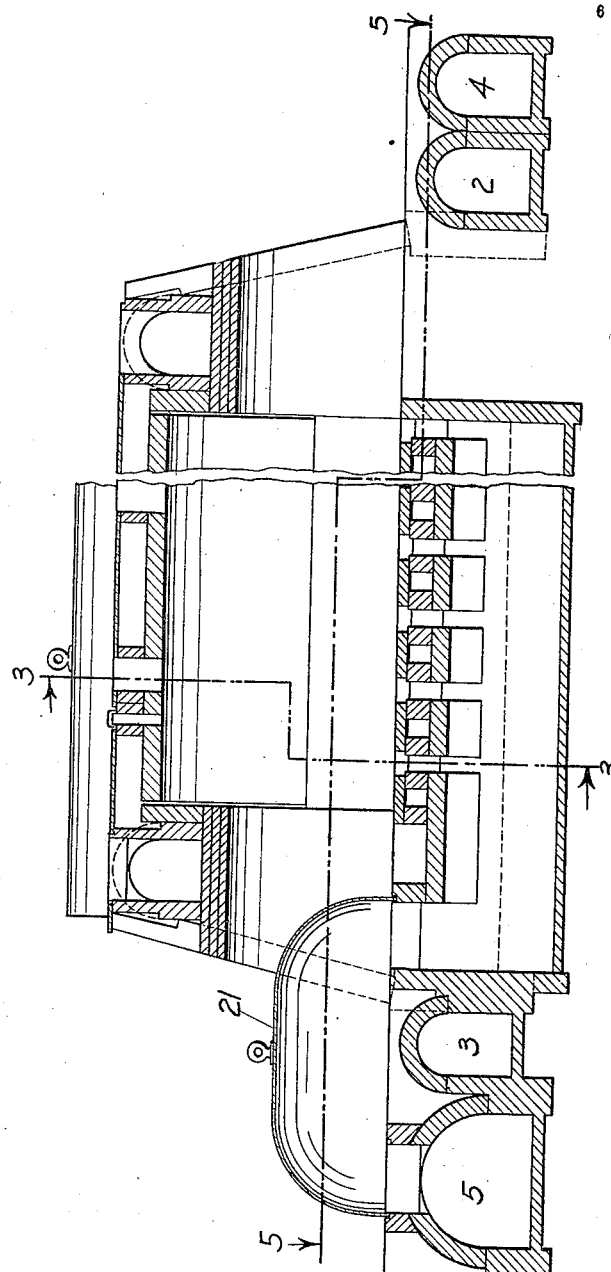
Figure 3:
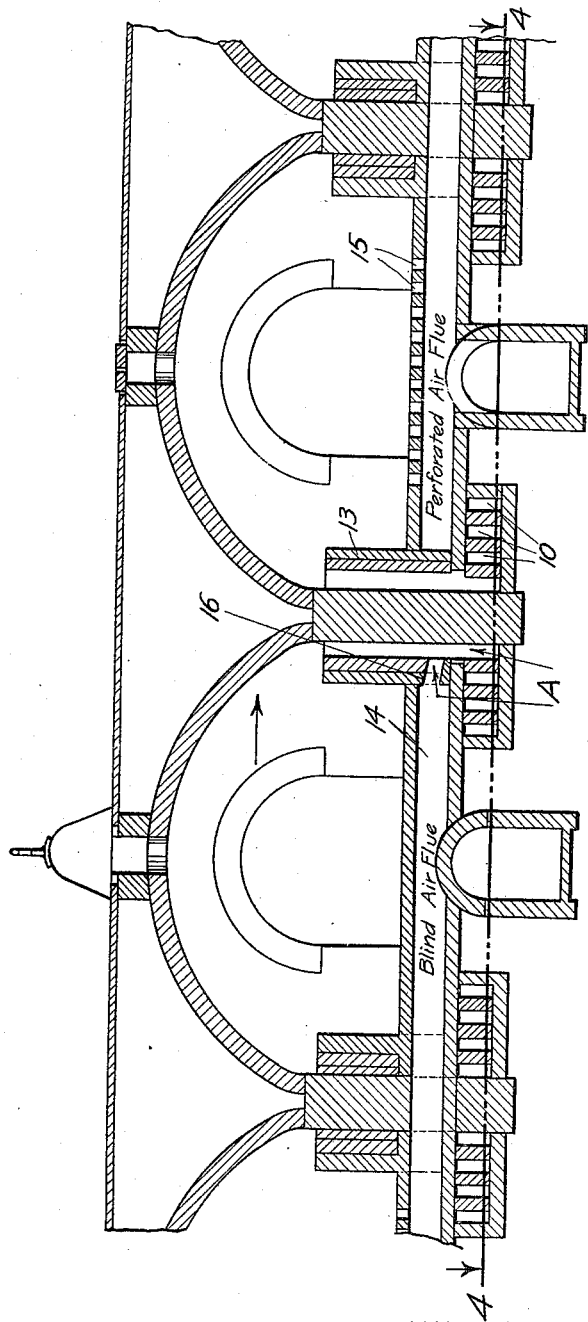
Figure 4:
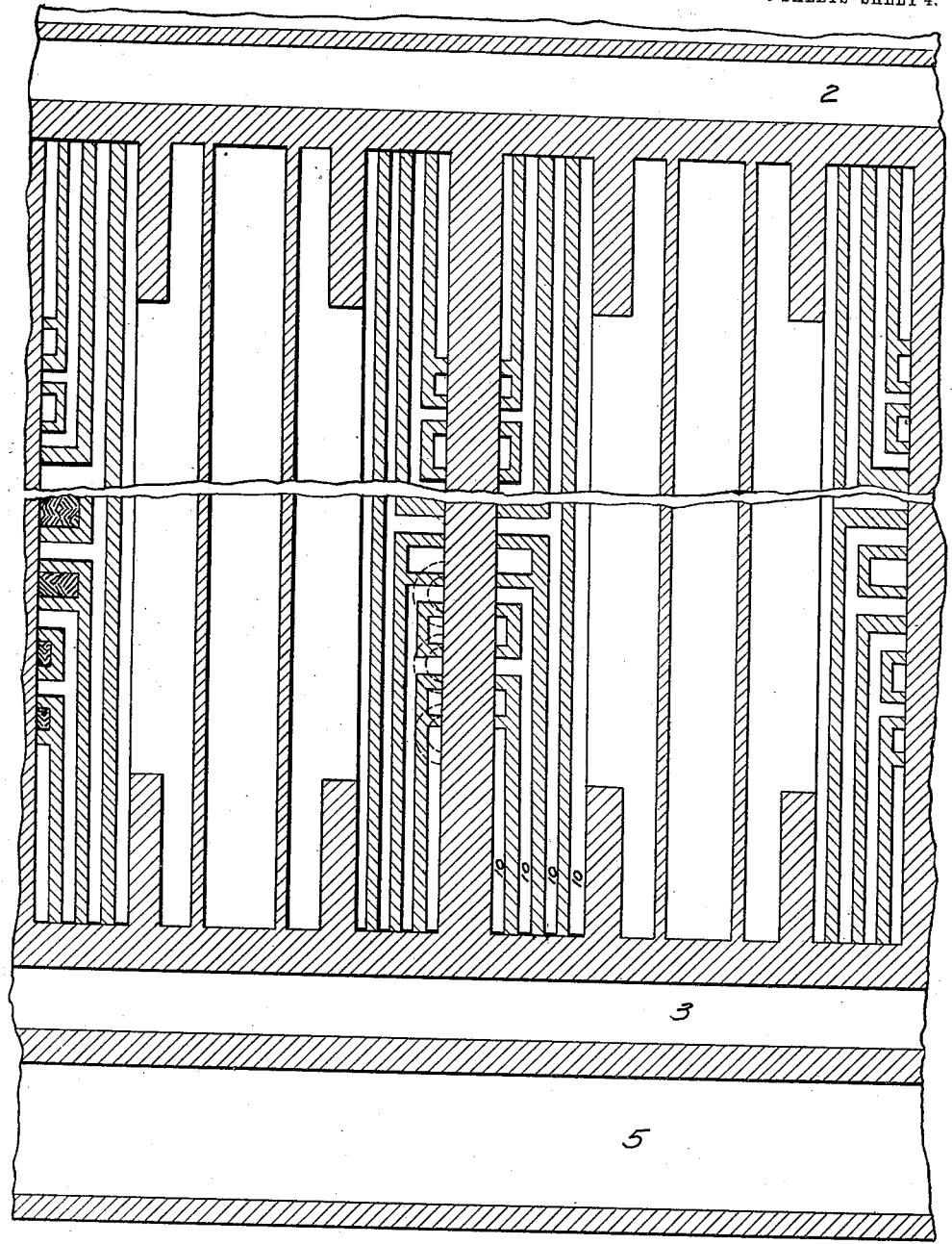
Figure 5:
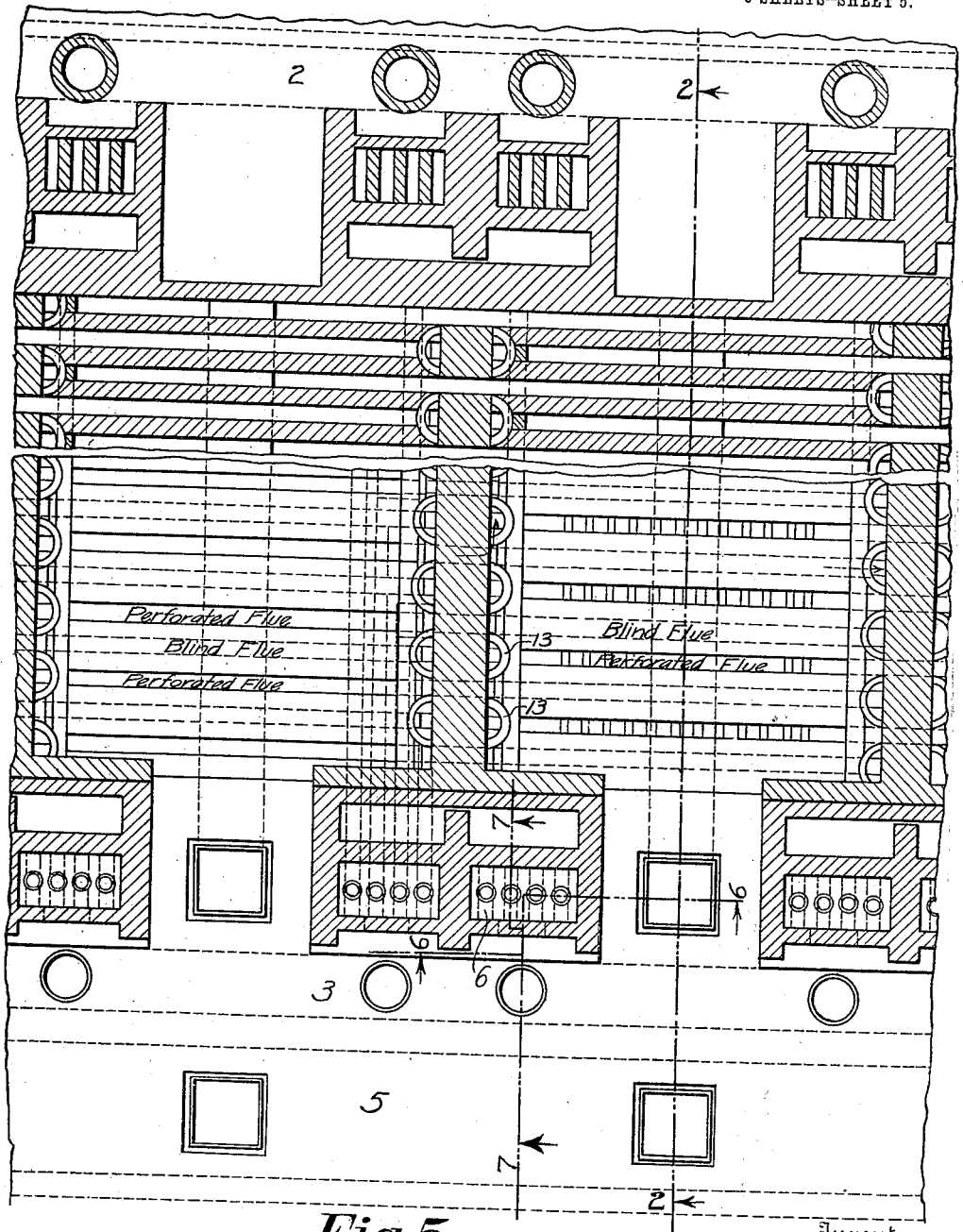
Figure 6:
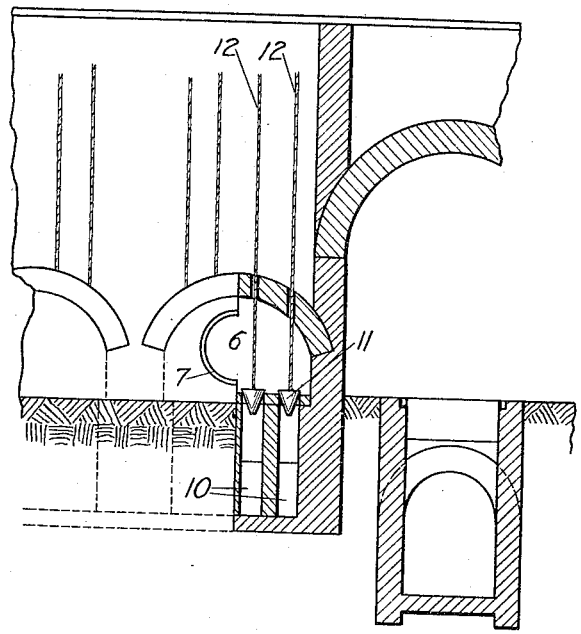
Figure 7:
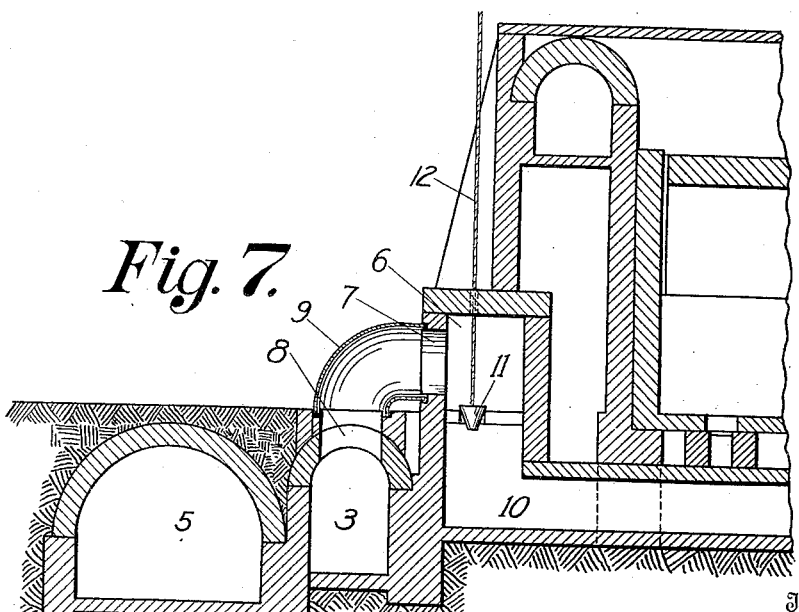

The preferred embodiment of my invention is shown in the accompanying drawing wherein similar characters of reference designate corresponding parts and wherein, Figure 1 is a diagrammatic plan showing the general structure of my improved kiln. Fig. 2 is a transverse section, partially broken away, of my kiln. Fig. 3 is a section taken on line 3—3 of Fig. 2, looking in the direction of the arrows. Fig. 4 is a section taken on line 4—4 of Fig. 3 and looking in the direction of the arrows. Fig. 5 is a section taken on line 5—5 of Fig. 2 and looking in the direction of the arrows. Fig. 6 is a detail in partial section taken on line 6—6 of Fig. 5 and looking in the direction of the arrows. Fig. 7 is a detail in section taken on line 7—7 of Fig. 5 and looking in the direction of the arrows.

In the drawing, by reference to Fig. 1, it will be noted that I have illustrated my improvement in connection with a kiln of the continuous type wherein there are twelve compartments disposed in a single row. These compartments may be each designated 1 and from this diagrammatic view, it will appear that each compartment has an opening at either end. Along either side of this row of compartments there extends a gas flue and these gas flues may be designated by the numerals 2 and 3 respectively, it being understood by the dotted line representations that the flues extend along either side of the kiln beneath the ground level. Out-side of these gas flues and likewise buried in the ground are main draft flues which are denoted by the reference numerals 4 and 5 respectively.

Each compartment is provided at either end with a doorway and upon either side of each doorway there is provided a gas chamber 6 having an opening 7 adapted for connection to an opening 8 in the gas flue 3 by means of an elbow pipe 9. (This structure being described is shown best in Figs. 2, 5, 6 and 7.) Each chamber 6 is connected at its base to the interior of its compartment by means of downwardly and inwardly extending ducts or passages, the entrances to which are controlled by valves 11, having operating cables 12. It will appear at this point that each compartment possesses two of these gas chambers at each end and it will be understood that the cables of all of the controlling valves for each side of each compartment are preferably extended to one location desirably near a peep-hole for that compartment. Each valve 11 controls the entrance of gas to one passage 10 and these passages 10 extend into the compartment by passing beneath the same to their points of connection to the bags of the compartment. The compartment of the kiln shown in the drawing contains fourteen bags on each side, in my preferred construction, and each seven of these bags are fed from a chamber 6 through the medium of the passages 10. The first of the bags 13, that is those bags which are adjacent the ends of the compartment are fed by single passages 10 which extend into such bags directly. The remaining bags are fed from passages 10 which extend along side thereof, one passage serving in each case to feed gas to two bags on the same side. (The manner in which this is accomplished is best shown in Figs. 4 and 5). It will be apparent that gas is fed to each compartment from both ends, seven bags on each side of a compartment being fed from one gas flue and the remaining bags being fed from the other gas flue.

The important fact to be noted at this point is that the gas flues and particularly the gas passages reach the interior of the compartments without passing through the compartment walls and in fact pass beneath the air flues to be hereinafter described. This is of importance for the reason that the compartment walls are subjected to very intense heat and the general experience has been that the contractions and expansions resulting therefrom have a tendency to produce cracks in the walls resulting in leakage of the gas and rendering impossible any adequate control of the quality and nature of the flame. In my improvement this difficulty is obviated in a simple manner and it is possible to control the quantity of gas admitted to the burning point. Furthermore, reconstruction of a kiln is much facilitated for the reason that compartment walls and crowns are much more readily rebuilt if there are no flues in the walls nor between the crowns.

Since the general manner of effecting drafts in these kilns is well known I shall not attempt to trace all the various possibilities of my kiln, but desire to lay particular stress upon the manner of introducing air into a compartment and properly causing its mixture with the gas prior to combustion. I have selected as an embodiment, a "two-side firing" kiln and a portion of my invention consists in the improved manner of bringing the air from one compartment into the next and distributing it to both sides of the compartment into which it is introduced.

An important feature of my invention, namely the novel method of attaining a thorough mixture of the gas and air is not limited to the particular type of kiln described. (The manner of introducing the air to the mixing point is shown best in Figs. 3 and 5). My air flue construction might be said to be divided into units 14 which are air flues extending across the base of two adjacent compartments. Each air flue 14 comprises an initial perforated half, the perforations being designated 15, and a blind or closed half. The perforated half disposed in one compartment takes up the heated air from that compartment and conducts it into the blind half, passing beneath a compartment wall and between two of the bags 13 on each side of this compartment wall and directly into one of the opposing bags 13. It will be noted by reference to the drawing that the bags in each compartment are diagonally disposed and that each blind flue passes along side of one bag and is connected thereto by a lateral duct, then passing directly across the base of the compartment and into the complemental bag. It will appear from this that unit flues are provided which take in the air and conduct it in substantially the same plane through a compartment wall and to opposite sides of a compartment by conducting it across the base of the same and under subjection to the heat within the compartment. In this manner a definite amount of air is given to each bag and comparative uniformity of distribution is effected.

By reference to Fig. 3, it will be noted that the gas flues extend at right angles to the air flues and beneath the same. It will also be noted by particular reference to the arrows A upon this figure that the air is introduced to the bag immediately above the gas. In preferred form the air is introduced through ports which direct the air downwardly onto the gas. One of these ports is shown at 16 in Fig. 3. The result is easily appreciated. The air is slightly heavier than the gas and consequently tends to rise more slowly. The gas in its endeavor to force its way upward produces a thorough intermingling of the fuel constituents, practically insuring the desired quality of flame. Directing the air downwardly onto the gas has a tendency to further enhance the intermingling in a manner that will be understood.

The primary features of my invention have been illustrated and described. I have not entered into a description of the complete operation of a continuous compartment kiln, as this seems unnecessary to an understanding of the invention.

It may be well to briefly describe Fig. 1 of the drawings and, in doing so, to state some of the possibilities of the construction shown. In this figure, the gas producers are shown connected to a soot chamber at one end of the kiln and this soot chamber is provided with ports 17 and 18 which may be connected to the openings 19 and 20 of the gas mains by elbow pipes bridging a return flue. The manner of connecting these gas mains to the valve-controlled chambers and thus to the gas passages has been set forth. The main draft flue 4 may be connected to the individual draft flues of the compartments by hoods 21, such as shown in Fig. 2 of the drawings, or it may, on occasion, be connected to the return flue for the purpose of burning out the soot in said flue. This last connection may be effected by joining the openings 22 and 23 and the openings 24 and 25. It is thought that the remaining possibilities may be apparent.

Having thus described my invention, what I claim is:

1. In a gas-fired kiln, a firing chamber, passages for conducting gas to said firing chamber, passages for conducting air to said firing chamber, said passages being so constructed that the air is directed downward onto the gas.

2. In a gas-fired kiln, a compartment, a gas main, gas ducts leading to a plurality of points in the compartment, and an intermediate distributing chamber from which said ducts lead, said chamber being accessible for repairs and adapted for connection to said main.

3. In a gas-fired continuous compartment kiln, a series of compartments, passages for conducting fuel into each of said compartments, chambers at the ends of said compartments from which certain of said fuel passages lead, said chambers being adapted for connection to a source of gas supply, and valves for controlling the exit of gas from said chambers.

4. In a gas-fired kiln, a firing compartment, means for conducting a combustible fluid to a plurality of points therein, and delivery ports disposed in staggered relation.

5. In a gas-fired kiln, a firing compartment, means for conducting a combustible fluid to a plurality of points therein, and opposing series of independent bag walls inclosing such points and disposed in staggered relation.

6. In a continuous compartment kiln, a draft flue which extends across the base of two compartments and through the intervening wall, said flue being perforate in one compartment and imperforate in the next, and diagonally opposing bags, the blind portions of said flues being extended past in connection with one set and into the interior of the opposing set of bags.

7. In a continuous compartment kiln, a draft flue which extends across the base of two compartments and through the intervening wall, said flue being perforate in one compartment and imperforate in the next, opposing bags, the blind portion of said flue being extended alongside of and connected to one bag and into the interior of the opposing bag.

8. In a continuous compartment kiln, a plurality of compartments, bags in diagonally opposite disposition, alternate perforate and blind flues in each compartment, said perforate flues leading into adjacent compartments by passing between bags, and said blind flues leading along side of and in connection with the interior of one set of bags and into the interior of the opposite set in the compartment.

9. In a continuous compartment gas-fired kiln, the combination of air flues in the floor of the kiln, and independent gas flues in the floor of the kiln and feeding the kiln without passing through the partition walls which separate compartments and support the crowns.

10. In a producer-gas-fired continuous kiln with main gas ducts underground on both sides of the kiln, a receiving and distributing chamber for the gas on both sides of the door of every compartment and on both ends of every compartment in the manner described.

11. In a producer-gas-fired continuous kiln, underground gas mains, a receiving and distributing chamber for the gas on both sides of the door and on both ends of every compartment with pipe connection for conducting the gas from said underground gas mains to the said receiving chamber and with multiple ports or outlets underneath said chamber for distributing the gas to ducts leading to multiple combustion bags in the burning compartments, the passage of the gas through each of these ports being regulated by valves.

12. In a producer-gas-fired continuous kiln, gas receiving and distributing chambers in or adjacent to the end walls of each compartment, multiple ports for the exit of the gas, draft flues, valves governing these ports, ducts under the draft flues, and running at right angles to the draft flues for distributing the gas to combustion bags on both sides of the compartments.

In testimony whereof I, hereby, affix my signature in presence of two witnesses.

WILLARD D. RICHARDSON.

Witnesses:
EDWIN C. MANN,
AGNES C. FLEMING.